Figure 1:
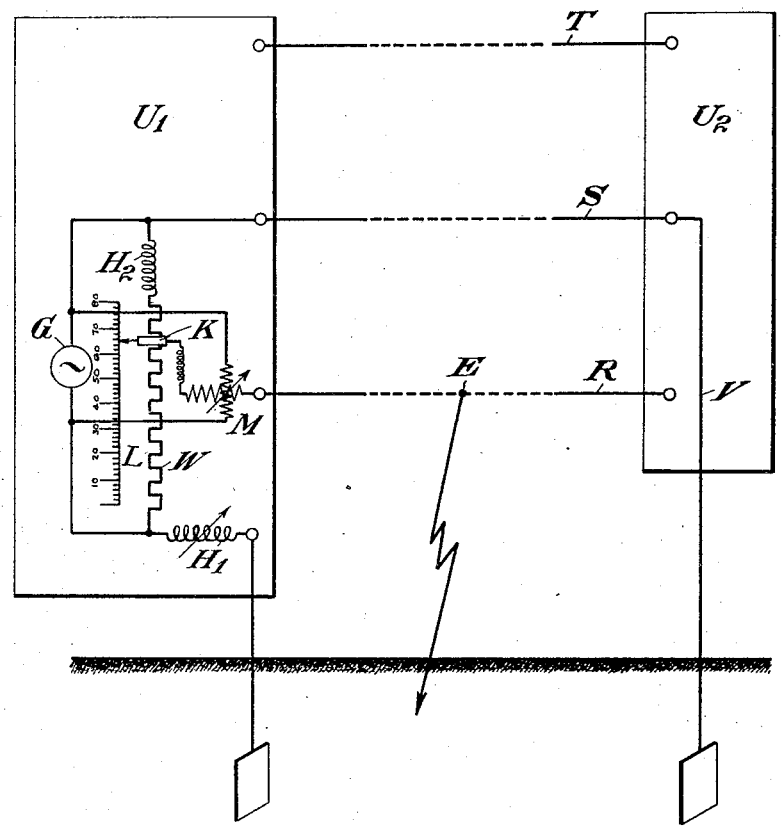

Oct. 6, 1931.  H. POLECK  1,825,754
APPARATUS FOR DETERMINING THE DISTANCE TO GROUND
CONNECTIONS IN ELECTRIC CONDUCTORS
Filed Nov. 26, 1927

Inventor:
Hans Poleck
by Locke, Kehlenkirk & Farley
Attorneys.

Patented Oct. 6, 1931

1,825,754

UNITED STATES PATENT OFFICE

HANS POLECK, OF BERLIN-LICHTERFELDE, GERMANY, ASSIGNOR TO SIEMENS & HALSKE AKTIENGESELLSCHAFT, OF SIEMENSSTADT, NEAR BERLIN, GERMANY, A CORPORATION OF GERMANY

APPARATUS FOR DETERMINING THE DISTANCE TO GROUND CONNECTIONS IN ELECTRIC CONDUCTORS

Application filed November 26, 1927, Serial No. 235,920, and in Germany December 3, 1926.

This invention relates to an apparatus for determining the distance to a leak or ground connection in an electric conductor.

It is known that the distance to a ground connection or leakage in an electric conductor or line can be determined with a certain approximation by a resistance measurement. The results of such measurements are however unreliable, as the resistance of the ground leakage itself, which is included in the measurement, can assume fairly considerable values which are not known in the individual case and falsify the result. According to the present invention, the resistance of the ground leakage itself is not measured, so that this source of error is avoided.

According to the invention, in a sub-station which is situated at one side of the ground leak, a parellel and sound conductor is connected to the ground. In a second sub-station, at the other side of the ground leak, an ohmic resistance is inserted between the sound parallel conductor and ground. This resistance forms one branch of a Wheatstone bridge, while the sound conductor and the ground return form the other branch. The ground connection or leak and one portion of the damaged conductor from one diagonal in which is placed the galvanometer or other measuring instrument. To the end points of the ohmic resistance switched in, is connected a source of alternating current, preferably with a frequency different from that of the mains in order to prevent the adjoining conductors which are still "live", from being able to falsify the result of measurement. As the conductors have not only an ohmic but also an inductive resistance, and as the diagonal branch can lose voltage only when the ohmic and inductive resistances in the whole bridge branch have the same ratio, it seems at first sight as if an equalization or balancing of the Wheatstone bridge would be generally quite impossible to obtain. It has been however found that the said ratio in the ground return and in the overhead line conductor at a given number of periods agree as a matter of fact to such an extent, that the balancing of the Wheatstone bridge can be effected with a sufficient degree of accuracy. Where considerable deviations appear, they can be eliminated by switching in a constant impedance determined by experimental measurement. In that way it is possible to build an apparatus for measuring the distance to a ground leak, in which the ohmic resistance which forms one branch of the bridge, is calibrated in distances, so that after the balancing of the bridge, the distance to the ground leak can be read directly.

Figure 2:
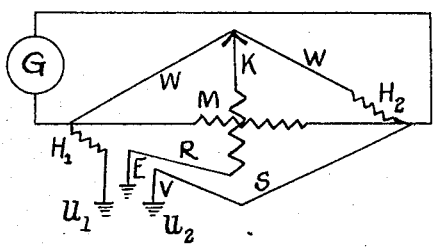

An example of a connection for carrying the invention into effect is illustrated in the accompanying drawings, in which Fig. 1 shows the use of my invention for locating a leak between two stations connected by a three-phase line one conductor of which is assumed as defective, and Fig. 2 is a diagram illustrating the Wheatstone bridge arrangement resulting in the case shown in Fig. 1.

R, S, T are the three conductors of a three phase current line, the conductor R of which has a leak or accidental ground connection at E. Let it be assumed that this ground connection has led to the three conductors being separated in the two sub-stations U1 and U2 from the remainder of the line either by hand or automatically. The question for the official in the sub-station U1 is now to determine the position of the ground connection E. The damaged phase R is known to him. He sends instructions to the sub-station U2 to ground a sound conductor, for instance S, by means of a connection conductor V. He himself switches in between the same sound conductor S and the ground, an ohmic resistance W. On the latter slides an adjustable contact K which is connected to the damaged conductor R through one coil of a measuring instrument M of the watt meter type. It will be understood that the operator at station $U_1$ switches or otherwise connects the proper terminal of said coil of the measuring instrument M to the damaged conductor R. The second coil of the said measuring instrument is connected to the terminals of a source of alternating current G which is connected to the ends of the ohmic resistance W. The use of a separate source of alternating current and of the wattmeter instrument M has firstly the advantage that the measurement cannot be affected by other sources of current. Moreover, only the watt component acts on it, so that the wattless components which are produced by the capacity of the conductors, have a smaller disturbing effect. It is more particularly advisable to make the frequency of the source of alternating current G different from that of the mains, so that even parallel conductors of the mains which are still under voltage cannot have any disturbing effect. In this method of connection, the sound conductor S, the connection conductor V, and the ground return from U2 to U1 constitutes one branch of a Wheatstone bridge, and the ohmic resistance W forms the other branch. In one diagonal is arranged the source of alternating current G, the other diagonal is constituted by the ground connection E one portion of the conductor R and the measuring instrument M. It will be obvious that the connections shown at station $U_1$ between the lines or wires R, S and the testing apparatus, are detachable or temporary connections, since the apparatus is intended to determine the location of a leak in any one of the three lines or wires R, S, T. The sliding contact K is adjusted so that no current passes thorugh the measuring instrument M. The position of the contact K gives then the resistance of the ground return between U1 and the ground connection E. The total resistance of the ground return between U1 and U2 is however known empirically, the ordinary assumption being that the resistance of the ground is about .05 of an ohm per kilometer. Consequently the partial resistance gives the distance of the ground connection. The balancing of the Wheatstone bridge can be always obtained when the impedance of the ground return and the impedance of the sound conductor S have the same phase displacement angle, or in other words, when the ratio of the ohmic component to the inductive component is the same in both. The special value of the invention consists in the fortunate circumstance that this condition is in fact fulfilled to a certain degree, as has been proved by experience. Any still existing differences can be eliminated or at least extensively reduced by switching in auxiliary impedances H1, H2. Their value is fixed once for all by experimenting. They help also to balance any voltages that may be produced during the measurement in overhead lines by mutual self induction.

Curiously enough, the ohmic resistance of a ground conductor for alternating current is approximately proportional to the frequency. By choosing a given measuring frequency, it is therefore possible to create the most favourable conditions for a sufficiently accurate measurement.

As hereinbefore referred to, the resistance W may be calibrated in distances; thus, as indicated in the drawings, the sliding contact K may be provided with a pointer indicating on a scale L graduated in kilometers, so that the operator may, without any calculation, read off directly the distance at which the leak E is from the station $U_1$.

I wish to add that the leak (indicated at E in the drawings) can be located according to my invention even if the ground resistance between $U_1$ and $U_2$ is unknown, as long as the resistance of the wire or line grounded through V is known (that is, in the drawings, the line S), as it always will be. It will be apparent that when the sliding contact K has been adjusted to a position in which no current passes through the instrument M, such position will indicate the ratio which the ground resistance between the station $U_1$ and the leak E bears to the sum of the resistance of the line S plus the ground resistance between the station $U_2$ and the leak E (disregarding the resistance of the connection V, as negligible). Evidently, if the resistance of the line S is known, the user can also deduce or figure from the position of the contact K, the ratio which the ground resistance between the station $U_1$ and the leak E bears to the ground resistance between the station $U_2$ and the leak E, thus locating such leak. It is however much simpler to assume that the total ground resistance between the stations $U_1$ and $U_2$ is known, it having been explained above that this is a reasonable assumption. With this assumption, the distance at which the leak E is located from the station $U_1$ can be read off directly upon a scale such as the drawing shows at L.

It is true the resistance to ground will vary according to the condition of the ground (wet or dry), but as regards their effect on the result of the measurement, the resistances to ground at the two stations will be opposed to each other and therefore have but a very slight influence on the result. This will become clear upon considering that in the ratio or quotient determined by the reading (the numerator of such quotient or fraction being equal to the resistance to ground at station $U_1$, plus the ground resistance between $U_1$ and E, while the denominator is equal to the ground resistance between station $U_2$ and leak E, plus the resistance to ground at station $U_2$, plus the resistance of the line S), the resistance to ground appears as a term in the numerator, as regards station $U_1$, and in the denominator, as regards the other station. Furthermore, at all power stations the resistance to ground is a known quantity and is kept as low as possible.

In order that the Wheatstone bridge arrangement resulting in the present case may be visualized more readily, a diagrammatic showing of such arrangement has been shown in Fig. 2.

Having now particularly described and ascertained the nature of my said invention and in what manner the same is to be performed, I declare that what I claim is:—

1. An apparatus for determining the distance to a ground connection located between two points or stations of an electric line having a plurality of conductors, comprising a resistance grounded at one end and adapted to be connected at the other end with a sound conductor of such line at one of said stations, a source of alternating current the terminals of which are connected with the respective ends of said resistance, a contact adjustable along said resistance, and an electric current-indicating instrument one terminal of which is connected with said contact while its other terminal is adapted for connection with the defective conductor, said sound conductor being adapted to be grounded at the other station so as to form a Wheatstone bridge arrangement in a diagonal of which said defective conductor is located and in which said instrument is situated.

2. An apparatus for determining the distance to a ground connection located between two points or stations of an electric line having a plurality of conductors, comprising a resistance grounded at one end and adapted to be connected at the other end with a sound conductor of such line at one of said stations, a source of alternating current the terminals of which are connected with the respective ends of said resistance, a contact adjustable along said resistance, an electric current-indicating instrument one terminal of which is connected with said contact while its other terminal is adapted for connection with the defective conductor, said sound conductor being adapted to be grounded at the other station so as to form a Wheatstone bridge arrangement in the diagonal of which said instrument is located, and an adjustable impedance in one of the branches of such Wheatstone bridge, to enable a compensation to be effected as regards the ohmic and the inductive components of the impedance of the conductors on one hand and the ground on the other hand.

3. An apparatus for determining the distance to a ground connection located between two points or stations of an electric line having a plurality of conductors, comprising a resistance grounded at one end and adapted to be connected at the other end with a sound conductor of such line at one of said stations, a source of alternating current the terminals of which are connected with the respective ends of said resistance, a contact adjustable along said resistance, and a two-coil electric current-indicating instrument of the wattmeter type having the ends of one of its coils connected with the respective terminals of said source of alternating current, the other coil having one of its terminals connected with said adjustable contact while the other terminal is adapted for connection with the defective conductor.

4. An apparatus for determining the distance to a ground connection located between two points or stations of an electric line having a plurality of conductors, comprising a resistance grounded at one end and adapted to be connected at the other end with a sound conductor of such line at one of said stations, a source of alternating current the terminals of which are connected with the respective ends of said resistance, a contact adjustable along said resistance, a distance-indicating scale co-operating with said adjustable contact, and an electric current-indicating instrument one terminal of which is connected with said contact while its other terminal is adapted for connection with the defective conductor, said sound conductor being adapted to be grounded at the other station so as to form a Wheatstone bridge arrangement in a diagonal of which said defective conductor is located and in which said instrument is situated.

In testimony whereof I affix my signature.

HANS POLECK.